(12) United States Patent
Abdulla et al.

(10) Patent No.: US 7,792,018 B2
(45) Date of Patent: Sep. 7, 2010

(54) INTELLIGENT LOAD BALANCING AND FAILOVER OF NETWORK TRAFFIC

(75) Inventors: Ayaz Abdulla, Sunnyvale, CA (US); Norman K. Chen, Sunnyvale, CA (US); Anand Rajagopalan, Saratoga, CA (US); Ashutosh K. Jha, Sunnyvale, CA (US); Hemamalini Manickavasagam, San Jose, CA (US); Sameer Nanda, Cupertino, CA (US)

(73) Assignee: NVIDIA Corporation, Santa Clara, CA (US)

( * ) Notice: Subject to any disclaimer, the term of this patent is extended or adjusted under 35 U.S.C. 154(b) by 267 days.

(21) Appl. No.: 11/750,984

(22) Filed: May 18, 2007

(65) Prior Publication Data

US 2008/0285441 A1 Nov. 20, 2008

(51) Int. Cl.
H04L 12/26 (2006.01)
(52) U.S. Cl. .................. 370/218; 370/392; 370/419; 370/431; 709/240
(58) Field of Classification Search .................. None
See application file for complete search history.

(56) References Cited

U.S. PATENT DOCUMENTS

| | | | |
|---|---|---|---|
| 5,508,997 A | 4/1996 | Katou | |
| 5,600,638 A | 2/1997 | Bertin et al. | |
| 5,724,510 A | 3/1998 | Arndt et al. | |
| 5,864,535 A * | 1/1999 | Basilico | 370/231 |
| 5,914,938 A * | 6/1999 | Brady et al. | 370/254 |
| 6,052,733 A | 4/2000 | Mahalingam et al. | |
| 6,151,297 A * | 11/2000 | Congdon et al. | 370/216 |
| 6,208,616 B1 | 3/2001 | Mahalingam et al. | |
| 6,512,774 B1 | 1/2003 | Vepa et al. | |
| 6,560,630 B1 | 5/2003 | Vepa et al. | |

(Continued)

FOREIGN PATENT DOCUMENTS

JP 11-027320 1/1999

(Continued)

OTHER PUBLICATIONS

Office Action. U.S. Appl. No. 11/750,919. Dated Jun. 12, 2009.

(Continued)

*Primary Examiner*—Daniel J Ryman
*Assistant Examiner*—Brian Roberts
(74) *Attorney, Agent, or Firm*—Patterson & Sheridan, LLP

(57) ABSTRACT

A hash engine in a network device driver maintains data on the utilization and error rate for each network interface card ("NIC") within a local computing device. From this data, the hash engine intelligently selects transmit NICs and receive NICs based on various networking parameters provided from a software driver program. Transmit packets sent from the operating system in a local computing device to a remote computing device are intercepted, modified and redirected to transmit NICs selected by the hash engine for transmission to remote computing devices. Similarly, address resolution protocol ("ARP") response packets sent by the operating system in response to ARP request packets are intercepted, modified and redirected to receive NICs selected by the hash engine for transmission. By selecting receive NICs and transmit NICs in this fashion, the hash engine is able to intelligently load balance transmit and receive traffic in the local computing device, thereby improving overall network performance relative to prior art techniques.

16 Claims, 9 Drawing Sheets

U.S. PATENT DOCUMENTS

| | | | |
|---|---|---|---|
| 6,567,377 | B1 | 5/2003 | Vepa et al. |
| 6,570,875 | B1 | 5/2003 | Hegde |
| 6,590,861 | B1 | 7/2003 | Vepa et al. |
| 6,683,882 | B1 | 1/2004 | Maufer et al. |
| 6,687,758 | B2 | 2/2004 | Craft et al. |
| 6,779,039 | B1 | 8/2004 | Bommareddy et al. |
| 6,938,092 | B2 | 8/2005 | Burns |
| 7,116,664 | B2* | 10/2006 | Davis et al. ............ 370/392 |
| 7,159,034 | B1 | 1/2007 | Rai |
| 7,299,294 | B1 | 11/2007 | Bruck et al. |
| 7,324,512 | B2 | 1/2008 | Larson et al. |
| 7,415,028 | B1 | 8/2008 | Allam |
| 2001/0056503 | A1 | 12/2001 | Hibbard |
| 2006/0010238 | A1 | 1/2006 | Craft et al. |
| 2006/0083227 | A1* | 4/2006 | Eldar ............... 370/389 |
| 2006/0171303 | A1 | 8/2006 | Kashyap |
| 2006/0206611 | A1 | 9/2006 | Nakamura |
| 2007/0002738 | A1 | 1/2007 | McGee |
| 2007/0025253 | A1* | 2/2007 | Enstone et al. ......... 370/235 |
| 2007/0201490 | A1* | 8/2007 | Mahamuni ........ 370/395.54 |
| 2008/0022148 | A1 | 1/2008 | Barnea et al. |
| 2008/0056246 | A1* | 3/2008 | McGee et al. ........... 370/389 |
| 2009/0222558 | A1 | 9/2009 | Xu et al. |
| 2010/0008251 | A1 | 1/2010 | Bender et al. |

FOREIGN PATENT DOCUMENTS

| | | |
|---|---|---|
| JP | 2000-029806 | 1/2000 |
| JP | 2000-187632 | 7/2000 |
| JP | 2008-295043 | 12/2008 |

OTHER PUBLICATIONS

Office Action. U.S. Appl. No. 11/305,177. Dated Aug. 6, 2009.
Office Action. U.S. Appl. No. 11/750,980. Dated Jul. 2, 2009.
Office Action. U.S. Appl. No. 11/750,914. Dated Jun. 29, 2009.
Office Action. U.S. Appl. No. 11/750,987. Dated Jun. 17, 2009.
Office Action. U.S. Appl. No. 11/750,903. Dated Jun. 22, 2009.
Translated Office Action, Korean Patent App. No. 10-2008-46351, dated Jan. 11, 2010.
Final Office Action. U.S. Appl. No. 11/750,914 dtd. Feb. 19, 2010.
Final Office Action. U.S. Appl. No. 11/305,177 dtd. Mar. 2, 2010.
Final OA, U.S. Appl. No. 11/750,919 dtd Dec. 24, 2009.
English translation of JP 2000-029806 (provided as explanation of relevance).
English translation of JP 2000-187632 (provided as explanation of relevance).
English translation of JP 11-027320 (provided as explanation of relevance).
English translation of JP 2008-295043(provided as explanation of relevance).
Masatoshi, Inuzuka. "Now see! Layer 4-7 Switch," Network World Japan, Jun. 2006, pp. 71-76.
English abstract of: Masatosh, "Now see! Layer 4-7 Switch," Network World Japan, Jun. 2006, provided as explanation of relevance.

* cited by examiner

INTELLIGENT LOAD BALANCING AND FAILOVER OF NETWORK TRAFFIC

BACKGROUND OF THE INVENTION

1. Field of the Invention

Embodiments of the present invention relate generally to network communications and more specifically to a system and method for intelligently load balancing and failing over network traffic using a hash engine.

2. Description of the Related Art

Performance and reliability are key requirements for modern computer networks. When a new network connection is initiated on a computing device that includes a plurality of network interface cards ("NICs"), the operating system typically selects a NIC for that connection without regard to the utilization or error rate of each NIC. One disadvantage of such environments is that new connections are often assigned to a NIC that is overloaded and/or unreliable, leading to reduced network performance for the new connection and possibly for other existing connections on the selected NIC.

Some prior art solutions attempt to avoid assigning new connections to overloaded and/or unreliable NICs by maintaining a sophisticated data structure containing "connection state." Analyzing this data structure allows a network device driver to determine which NICs are overloaded and/or unreliable. However, the structure of this connection state does not lend itself to efficiently identifying which NIC has been assigned to each connection or to efficiently redistributing connections from an overloaded or unreliable NIC to a fully functional NIC. Additionally, maintaining and analyzing this connection state is computationally expensive, which can degrade computational and network performance for the computing device.

As the foregoing illustrates, what is needed in the art is a more efficient technique for distributing and redistributing network connections across NICs in a computing device.

SUMMARY OF THE INVENTION

One embodiment of the present invention sets forth a method for intelligently transferring a network connection to a network interface card (NIC) for receiving network traffic. The method includes intercepting an address resolution protocol (ARP) response packet generated by an operating system, where the ARP response packet has a first media access control (MAC) address associated with a first NIC that has been selected by the operating system to receive network traffic related to the network connection, decoding the ARP response packet, generating a second MAC address associated with a second NIC by providing to a hash function one or more network parameters included in the decoded ARP response packet, and replacing the first MAC address in the ARP response packet with the second MAC address.

One advantage of the disclosed method is that it allows network connections to be intelligently transferred across multiple NICs in a computing device using a hash engine. Connection transfer may be employed to perform load balancing, failover, or failback functions. In this fashion, running network connections through overloaded or unreliable NICs may be more easily avoided, thereby improving overall network performance.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Intelligent load balancing and failover of network connections among a plurality of NICs in a computing device may be accomplished by using a network driver that intercepts, modifies and redirects packets transmitted from an operating system in a computing device to a remote computing device on a network. Receive traffic for a connection may be load balanced or failed over by intercepting address resolution protocol ("ARP") response packets as they are transmitted by the operating system to the remote computing device. Intercepted ARP response packets are modified to include the MAC address of a NIC selected by the network driver to receive traffic for the connection, before being sent on to the remote computing device. This modification leads to receive traffic from the remote computing device arriving at the NIC selected by the network driver, rather than arriving at the NIC selected by the operating system.

Similarly, transmit traffic for a connection may be load balanced or failed over by intercepting standard transmit packets as they are transmitted by the operating system to the remote computing device. Intercepted transmit packets are modified to include the MAC address of a NIC selected by the network driver to transmit traffic for the connection, before being sent on to the remote computing device. This modification leads to transmit traffic being sent to the remote computing device through the NIC selected by the network driver rather than through the NIC selected by the operating system.

Figure 1A:
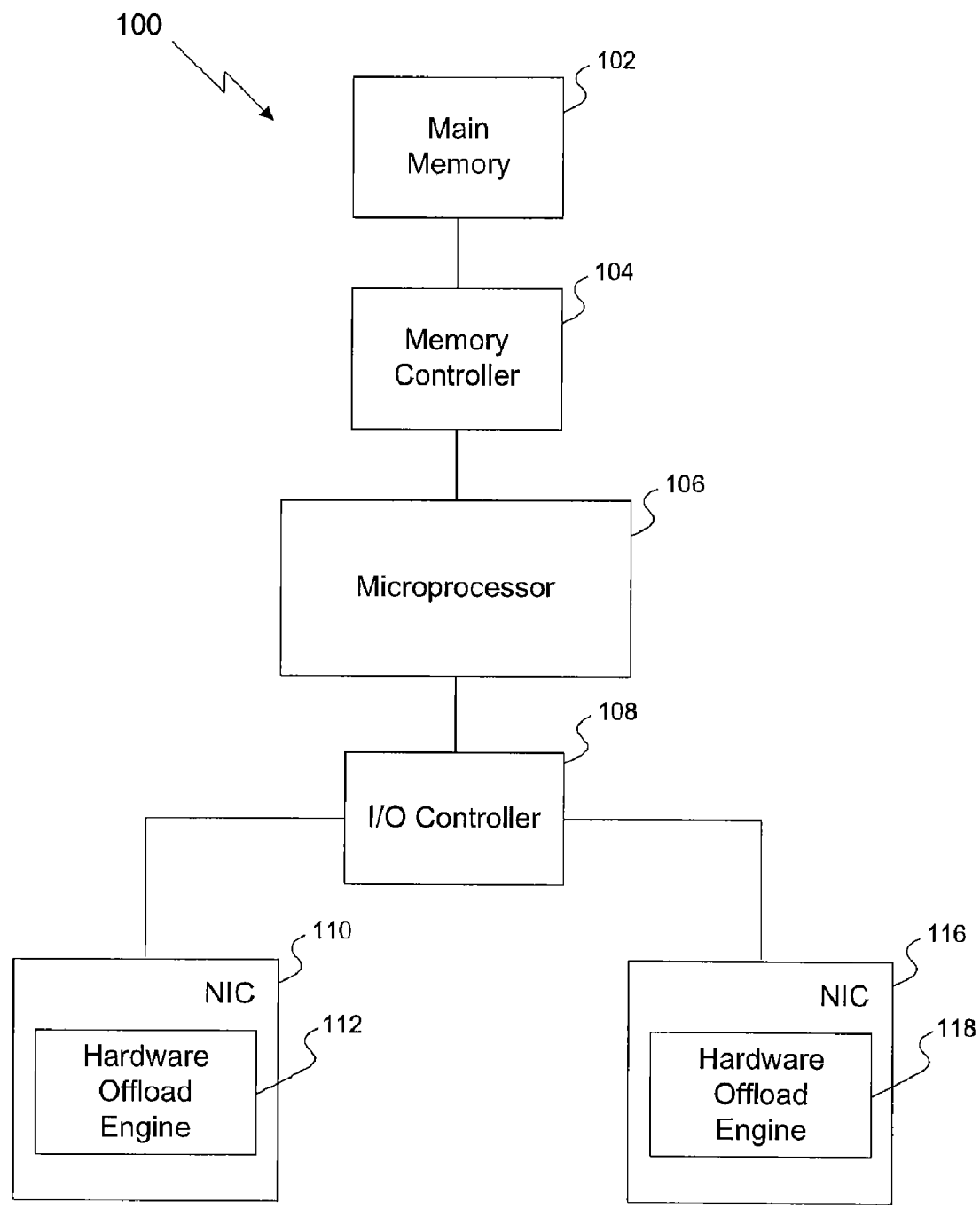
FIGS. 1A-1C illustrate a computing device in which one or more aspects of the present invention can be implemented.
Figure 1B:
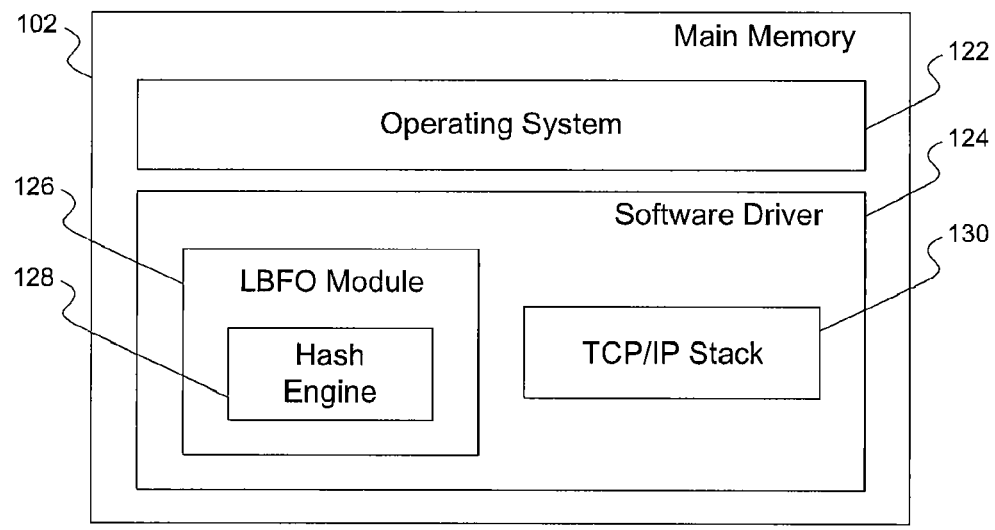
Figure 1C:
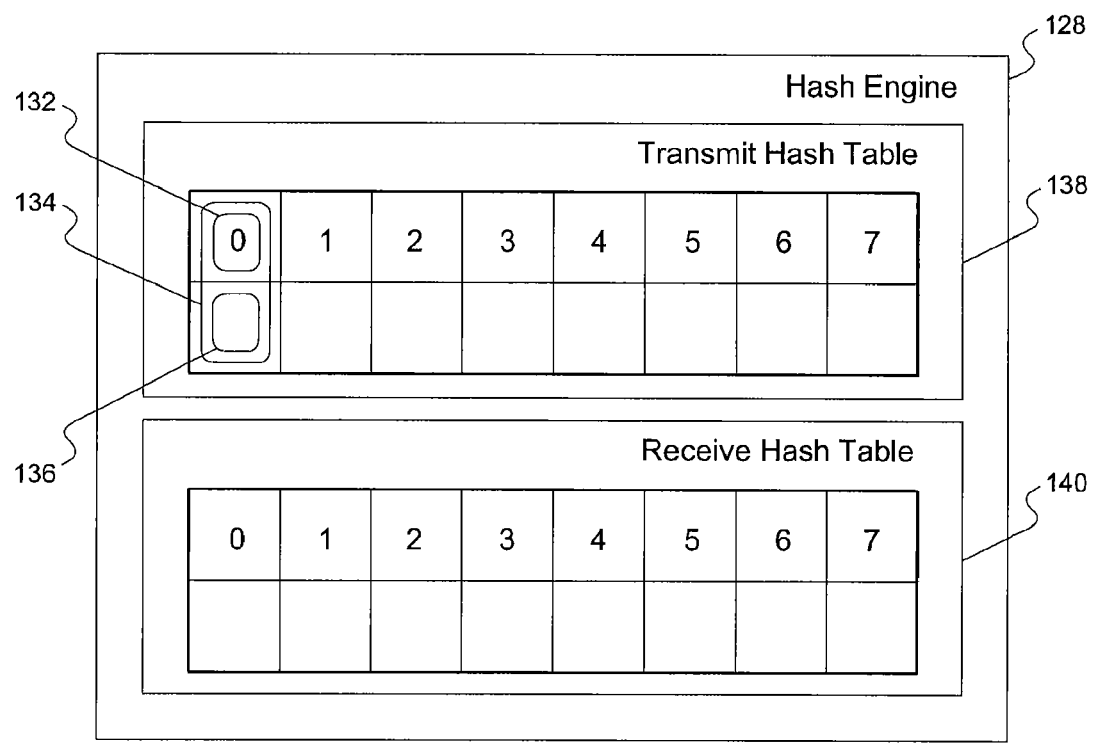

FIGS. 1A-1C illustrate a computing device 100 in which one or more aspects of the present invention can be implemented. The computing device 100 may be a desktop computer, server, laptop computer, palm-sized computer, personal digital assistant, tablet computer, game console, cellular telephone, or any other type of similar device that processes information. As shown, the computing device 100 includes a main memory 102, a memory controller 104, a microprocessor 106, an I/O controller 108, and NICs 110, 116. NIC 110 includes a hardware offload engine ("HOE") 112 and NIC 116 includes a HOE 118. HOEs 112 and 118 include logic configured for processing network frames associated with network connections between the computing device 100 and one or more remote network computing devices (not shown) that have been selectively offloaded to NICs 110, 116. By processing network frames with HOEs 112 and 118 (sometimes referred to as "handling connections in hardware") rather than performing those processing functions in a host software transmission control protocol and internet protocol ("TCP/IP") stack (sometimes referred to as "handling connections in software"), as is conventionally done, communications between the NICs 110, 116 and the microprocessor 106 as well as computations performed by the microprocessor 106 may be substantially reduced.

The memory controller 104 is coupled to the main memory 102 and to the microprocessor 106, and the I/O controller 108 is coupled to the microprocessor 106 and the NICs 110, 116. In one embodiment of the invention, the microprocessor 106 transmits commands or data to the NICs 110, 116 by writing commands or data into the I/O controller 108. Once such commands or data are written into the I/O controller 108, the I/O controller 108 optionally translates the commands or data into a format that the target NIC may understand and communicates the commands or data to the target NIC. Similarly, NICs 110, 116 transmit commands or data to the microprocessor 106 by writing commands or data into the I/O controller 108, and the I/O controller 108 optionally translates the commands or data into a format that the microprocessor 106 may understand and communicates the commands or data to the microprocessor 106. The aforementioned couplings may be implemented as memory busses or I/O busses, such as PCI™ busses, or any combination thereof, or may otherwise be implemented in any other technical feasible manner.

As shown in more detail in FIG. 1B, the main memory 102 includes an operating system 122 and a software driver 124. The software driver 124 includes a Load Balancing and Failover ("LBFO") module 126 and a TCP/IP stack 130. The LBFO module 126 tracks networking status for each NIC (e.g., the link status of each NIC, the number of send and receive errors on each NIC and/or whether each NIC is sending and receiving keep-alive packets) and communicates with the TCP/IP stack 130 when network connections are being moved from one NIC to another NIC within the computing device 100. The LBFO module 126 includes a hash engine 128, which intelligently determines how network connections should be distributed across the different functional NICs in the computing device 100, based on the aforementioned networking status of each NIC.

As shown in more detail in FIG. 1C, the hash engine 128 includes a transmit hash table 138 and a receive hash table 140. The purpose of the transmit hash table 138 is to select a functional NIC within the computing device 100 for transmitting packets related to a network connection, based on data provided to the transmit hash table 138 by the LBFO module 126. The transmit hash table 138 includes a plurality of hash table entries (e.g., hash table entry 134) and a software hash function (not shown). Additionally, each hash table entry includes a table index (e.g., table index 132) and a table value (e.g., table value 136). The LBFO module 126 directs the hash engine 128 to select a transmit NIC within the computing device 100 by communicating TCP/IP connection data to the hash engine 128, which communicates the TCP/IP connection data to the software hash function in the transmit hash table 138. In response, the software hash function selects a table index within the transmit hash table 138, based on the TCP/IP connection data. From this selected table index, the transmit hash table 138 identifies the corresponding table value, and the hash engine 128 communicates the identified table value back to the LBFO module 126. If the corresponding table value is invalid, the hash engine 128 selects a NIC for the connection based on a weighted combination of NIC utilization and NIC error rate data for all NICs in the computing device 100, as maintained by the LBFO module 126, and the hash engine 128 stores the MAC address of the selected NIC in the table value corresponding to the current table index. Since the design and operation of software hash functions is well known to those skilled in the art, these issues will not be discussed herein. In one embodiment, the LBFO module 126 communicates the following four TCP/IP data to the hash engine 128: the client internet protocol ("IP") address, the server IP port, the client IP port, and the virtual local area network identifier ("VLAN ID"). In other embodiments, the LBFO module 126 may communicate any technically feasible TCP/IP parameters to the hash engine 128.

The purpose of the receive hash table 140 is to select a functional NIC within the computing device 100 for receiving packets related to a network connection, based on the data provided to the receive hash table 140 by the LBFO module 126. Similar to the transmit hash table 138, the receive hash table 140 includes a plurality of hash table entries and a software hash function (not shown), and each hash table entry includes a table index and a table value. Again, the LBFO module 126 directs the hash engine 128 to select a receive NIC within the computing device 100 by communicating TCP/IP connection data to the hash engine 128, which communicates the TCP/IP connection data to the software hash function in the receive hash table 140. In response, the software hash function selects a table index within the receive hash table 140, based on the TCP/IP connection data. From this selected table index, the receive hash table 140 identifies the corresponding table value, and the hash engine 128 communicates the identified table value back to the LBFO module 126. Again, if the corresponding table value is invalid, the hash engine 128 selects a NIC for the connection based on a weighted combination of NIC utilization and NIC error rate data for all NICs in the computing device 100, as maintained by the LBFO module 126, and the hash engine 128 stores the MAC address of the selected NIC in the table value corresponding to the current table index. In one embodiment, the TCP/IP data that the LBFO module 126 communicates to the hash engine 128 includes the server IP address. In other embodiments, the LBFO module 126 may communicate any technically feasible TCP/IP data to the hash engine 128.

Importantly, the structure of the hash engine 128 efficiently supports transferring connections from one NIC to another NIC when performing load-balancing, fail-over or fail-back operations. For example, in one embodiment, if a first NIC is overloaded and the LBFO module 126 intends to transfer some connections on the first NIC to a second NIC, the hash engine 128 may invalidate a hash table entry whose hash table value contains the MAC address of the overloaded first NIC. As described in more detail in the discussion of FIG. 2 below, invalidating the hash table entry leads to the hash engine 128 selecting the second NIC as a new NIC for connections that correspond to the invalidated hash table entry and storing the MAC address of the second NIC in the hash table entry. After this change to the hash table value, all connections whose hash table index corresponds to the modified hash table value will communicate through the second NIC.

Additionally, the structure of the hash engine 128 efficiently supports failing-over connections from one NIC to another NIC. For example, in one embodiment, if a first NIC has failed or has become unreliable and the LBFO module 126 intends to transfer the connections on the first NIC to a second NIC, the hash engine 128 may invalidate all hash table entries whose hash table values include the MAC address of the failed or unreliable NIC. Again, as described in FIG. 2 below, invalidating hash table entries leads to the hash engine 128 selecting the second NIC as a new NIC for connections that correspond to the invalidated hash table entries and the hash table 128 storing the MAC address of the second NIC in those hash table entries. Once all hash table values that included the MAC address of the failed or unreliable NIC have been overwritten with the MAC address of the second NIC, all connections on the first NIC have been failed-over to the second NIC. More details regarding the functionality of the LBFO module 126 during failover are described in the related U.S. patent application titled, "Intelligent Failover In a Load-Balanced Networking Environment," filed on May 18, 2007 and having Ser. No. 11/750,903. This related patent application is hereby incorporated herein by reference.

Further, the structure of the hash engine 128 efficiently supports failing-back connections from one NIC to another NIC. For example, in one embodiment, if the LBFO module 126 had failed-over some connections from a first NIC to a second NIC, and the first NIC subsequently became fully functional, the LBFO module 126 may failback the some or all of the failed-over connections to the first NIC. In one embodiment, the LBFO module 126 may failback selected connections by updating the hash table values corresponding to the selected failed-over connections to store the MAC address of the first NIC rather than the second NIC. Once the hash table values that included the MAC address of the second NIC have been overwritten with the MAC address of the first NIC, the connections corresponding to the overwritten hash table values have been failed-back to the first NIC. More details regarding the functionality of the LBFO module 126 during failback are described in the related U.S. patent application titled, "Intelligent Failback In a Load-Balanced Networking Environment," filed on May 18, 2007 and having Ser. No. 11/750,914. This related patent application is hereby incorporated herein by reference.

Based on the aforementioned discussions of load balancing and failover/failback, the invention may be configured to operate in four modes, each efficiently addressing the needs of a different operational environment. In a first operational mode, the hash engine 128 is used to transfer connections to perform load balancing and failover/failback in a switch-independent network environment (i.e., a network environment in which a switch coupling the NICs of computing device 100 to an external network is not operating in 802.3ad mode). In this embodiment, the methods of FIGS. 3 and 4, described below, use the hash engine 128 to identify NICs for transferring a connection for receiving traffic and transmitting traffic, respectively. Again, this identification may be performed as part of load balancing, or as part of failing-over a connection to a reliable NIC. Importantly, the receive traffic and the transmit traffic for a connection may utilize different NICs unless the connection is offloaded, which leads to a single NIC handling the receive traffic and the transmit traffic for the offloaded connection, as described in more detail below.

In a second operational mode, the hash engine 128 is used to transfer connections to perform load balancing on the transmit traffic but is not used to perform load balancing on the receive traffic, in a switch-independent network environment. Importantly, in this operational mode, the hash engine 128 is not used to transfer connections to perform failover or failback. Thus, the hash engine 128 may select a NIC for the transmit traffic on a connection and may subsequently modify that selection to load balance transmit traffic, but the receive traffic for the connection is handled through a NIC selected by the operating system. Again, the receive traffic and the transmit traffic for a connection may utilize different NICs unless the connection is offloaded, which leads to the NIC selected by the operating system handling the receive traffic and the transmit traffic for the offloaded connection, as described in more detail below.

In a third operational mode, the hash engine 128 is used to transfer connections to perform failover and failback but not to perform load balancing, in a switch-independent network environment. Since the hash engine 128 does not transfer connections to perform load balancing in this embodiment, the NIC selected by the operating system 122 for transmitting traffic and for receiving traffic on the connection is maintained. Additionally, the LBFO module 126 may direct the hash engine 128 to failover network traffic when NICs fail or become unreliable, as well as directing the hash engine 128 to failback traffic when NICs return to being fully functional.

In a fourth operational mode, the hash engine 128 is used to transfer a connection to perform load balancing and failover/failback of transmit traffic but not receive traffic, in a switch-dependent network environment (i.e., a network environment in which a switch coupling the NICs of computing device 100 to an external network is operating in 802.3ad mode). Importantly, in a switch-dependent network environment, the switch selects which NIC in the computing device 100 receives traffic for a connection. Therefore, the hash engine 128 does not perform load balancing or failover/failback of receive traffic but the hash engine 128 may load balance transmit traffic and the LBFO module 126 may direct the hash engine 128 to failover/failback transmit traffic. However, again, if the network connection is offloaded on the NIC selected by the switch to receive traffic for the connection, then the hash engine 128 selects the same NIC to transmit traffic for that connection, as described in further detail below.

Figure 2:
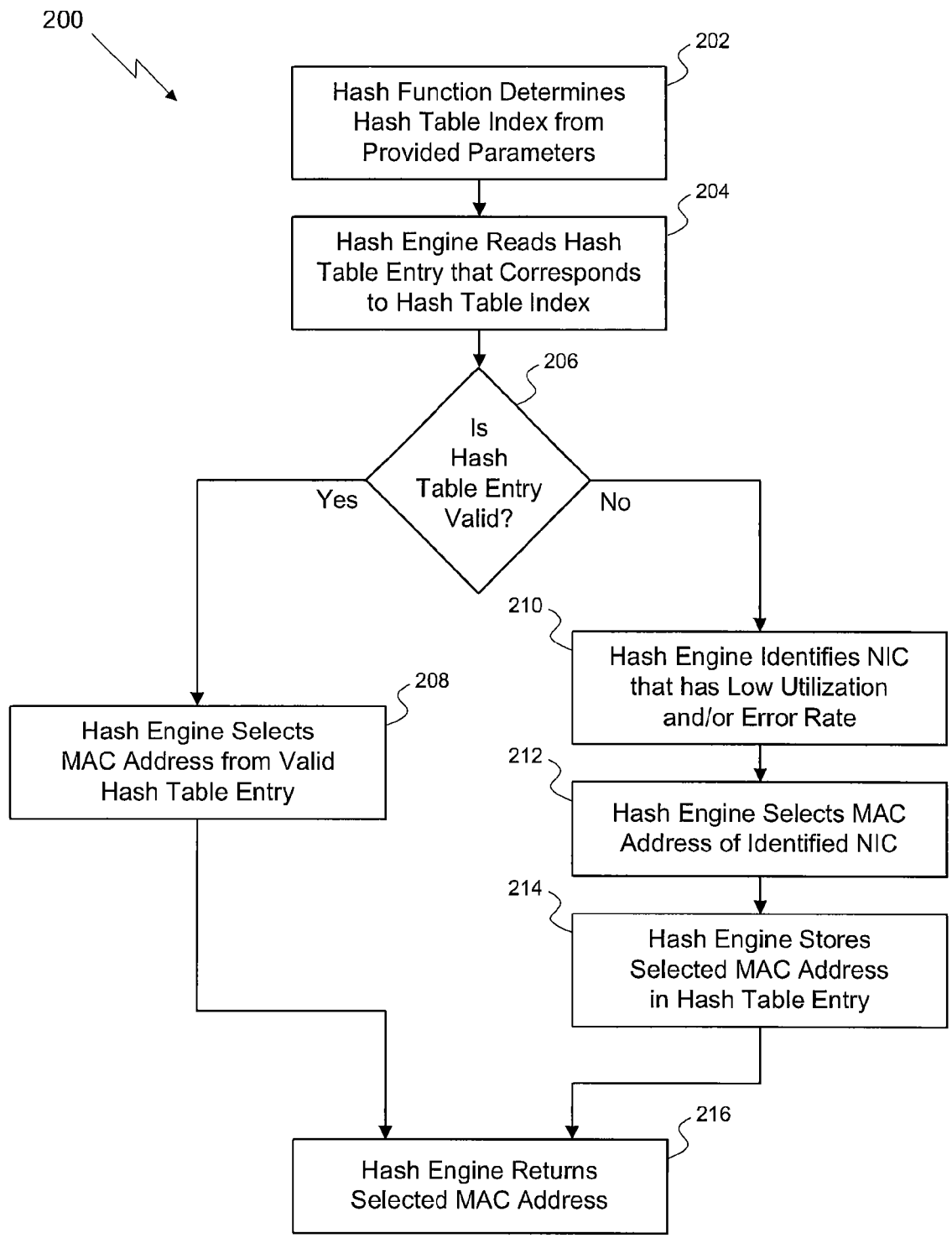
FIG. 2 illustrates a flowchart of method steps for selecting a MAC address from a hash table, based on parameters provided to a hash function, according to one embodiment of the invention.

FIG. 2 illustrates a flowchart of method steps 200 for selecting a MAC address from a hash table, based on parameters provided to a hash function, according to one embodiment of the invention. Although the method is described in reference to the computing device 100, persons skilled in the art will understand that any system configured to perform the method steps, in any order, is within the scope of the present invention.

As shown, the method for selecting a MAC address from a hash table in the hash engine 128 begins at step 202, where the hash function within the hash table determines a hash table index from parameters received by the hash function. Since the methods for creating and using a hash function to index a hash table, based on parameters provided to the hash function, is well known to those skilled in the art, these methods will not be discussed herein. One should note that the parameter(s) received by the transmit hash function, in its role of indexing the transmit hash table 138, may differ from the parameter(s) received by the receive hash function, in its role of indexing the receive hash table 140. In one embodiment of the invention, the receive hash function receives the IP address of the remote computing device as a parameter for indexing the receive hash table 140. Additionally, the transmit hash function receives the IP address of the remote computing device, a TCP port for the remote computing device, a TCP port for the computing device 100, and a VLAN ID, if VLAN technology is utilized in the networking environment, as parameters for indexing the transmit hash table 138. In other embodiments of the invention, the receive hash function and the transmit hash function may receive any technically feasible parameters for indexing the receive hash table 140 and the transmit hash table 138, respectively.

In step 204, the hash engine 128 reads a hash table entry that corresponds to the hash table index identified in step 202. In step 206, the hash engine 128 determines whether the hash table entry read in step 204 is valid. If, in step 206, the hash table entry is valid, the method continues to step 208, where the hash engine 128 selects the MAC address stored in the indexed hash table entry. In step 216, the hash engine 128 returns the selected MAC address to the LBFO module 126, and the method terminates.

If, in step 206, the hash table entry read in step 204 is not valid, the method continues to step 210, where the hash engine 128 identifies a NIC that is suitable for communicating network traffic. In one embodiment, a NIC is deemed to be suitable for communicating network traffic when the utilization of that NIC, as a percentage of the transmit capacity or the receive capacity of that NIC, is lower than the utilization of the other NICs in the computing device 100. In another embodiment, a NIC is deemed to be suitable for communicating network traffic when the error rate for the NIC is lower than the error rate of the other NICs in the computing device 100. In yet-another embodiment, a weighted combination of utilization and error rate for a NIC, relative to the weighted combination of utilization and error rate of other NICs in the computing device 100, may be used to determine whether a NIC is suitable for communicating network traffic. In step 212, the hash engine 128 selects the MAC address of the suitable NIC identified in step 210. In step 214, the hash engine 128 stores the selected MAC address in the hash table entry that corresponds to the hash table index identified in step 202.

Figure 3A:
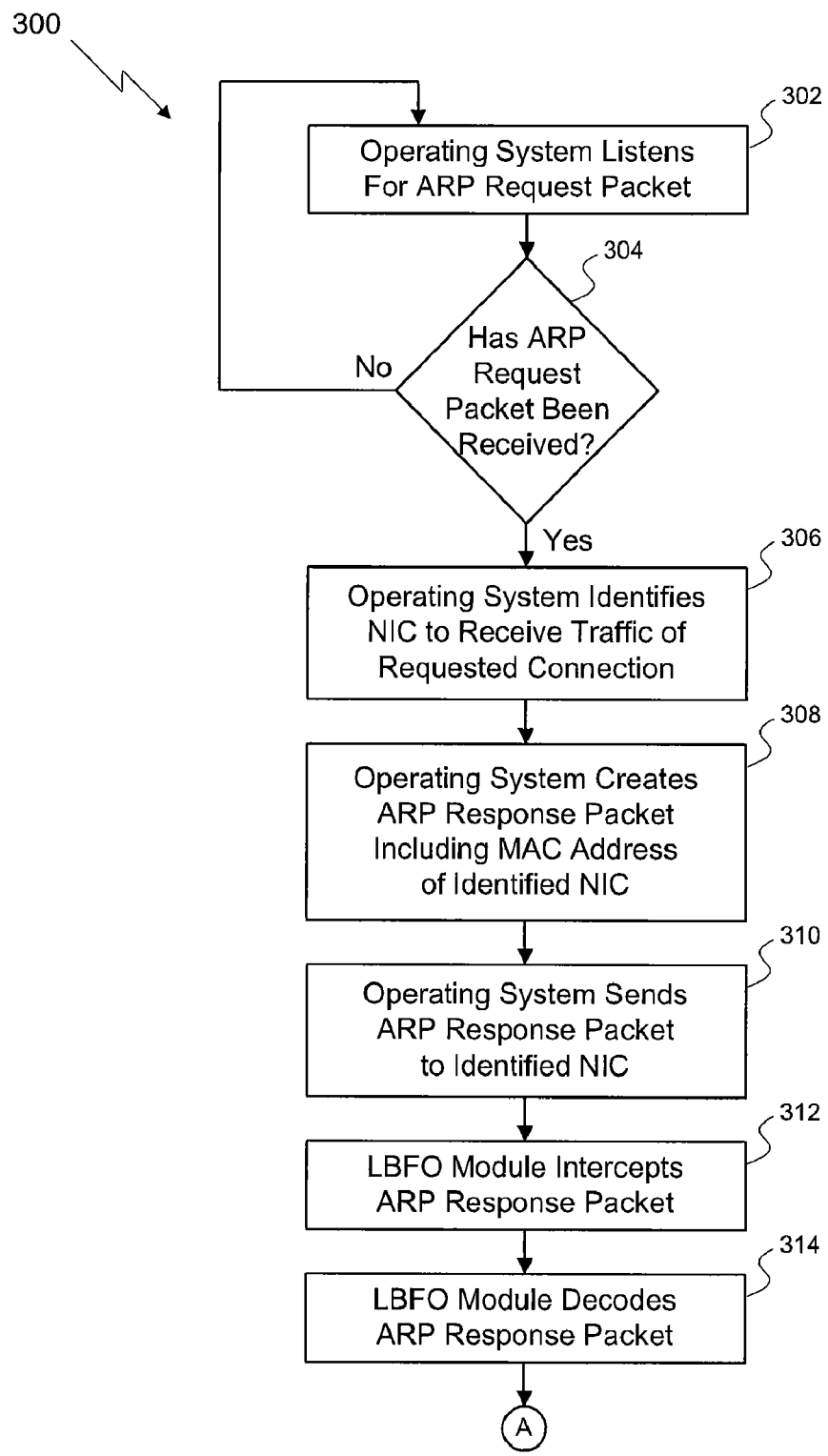
FIGS. 3A and 3B illustrate a flowchart of method steps for transferring a connection to a NIC selected by the hash engine to receive network traffic, according to one embodiment of the invention.
Figure 3B:
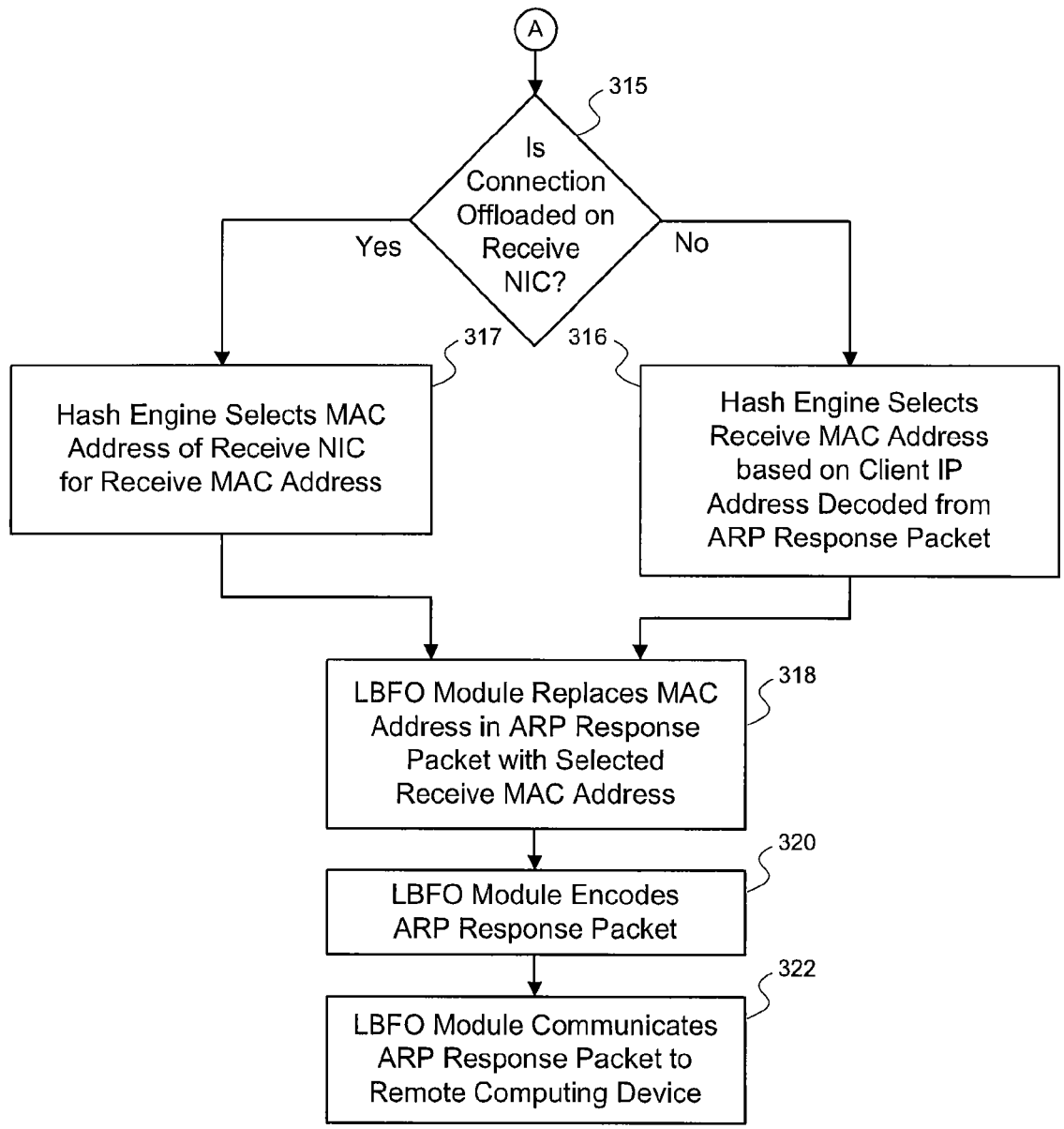

FIGS. 3A and 3B illustrate a flowchart of method steps 300 for transferring a connection to a NIC selected by the hash engine 128 to receive network traffic, according to one embodiment of the invention. Although the method is described in reference to the computing device 100, persons skilled in the art will understand that any system configured to perform the method steps, in any order, is within the scope of the present invention.

As shown, the method for transferring a connection begins at step 302, where the operating system 122 listens for an ARP request packet from a remote computing device (not shown). When the remote computing device initiates a connection for transmitting data to the computing device 100, the remote computing device requests the MAC address of the computing device 100 by sending an ARP request packet that includes the IP address of the computing device 100 to computing devices coupled to the local network. The computing device 100 responds to the ARP request packet by sending an ARP response packet that includes the MAC address of the computing device 100. Upon receiving and decoding the ARP response packet, the remote computing device may transmit packets to the local computing device 100 using the MAC address decoded from the ARP response packet. Since the methods for exchanging ARP request packets and ARP response packets are well known to those skilled in the art, these methods will not be discussed herein. In step 304, the operating system 122 determines whether an ARP request packet was received in step 302. If the operating system 122 finds that an ARP request packet was not received, then the method returns to step 302, where the operating system 122 continues to listen for an ARP request packet.

If, in step 304, however, the operating system 122 finds that an ARP request packet was received, then the method continues to steps 306-310, where the operating system 122 generates an ARP response packet in response to receiving the ARP request packet. In step 306, the operating system 122 identifies a NIC through which traffic for the connection is to be received. For purposes of discussion only, it is assumed that the operating system 122 selects NIC 110 as the NIC to use for receiving traffic. In step 308, the operating system 122 creates an ARP response packet, including the MAC address of the NIC 110. In step 310, the operating system 122 sends the ARP response packet to the NIC 110.

In step 312, the LBFO module 126 intercepts the ARP response packet sent from the operating system 122 to NIC 110. Again, the LBFO module 126 is configured to intercept ARP response packets sent from the operating system 122 to a NIC selected by the operating system 122 in the computing device 100 and to modify the MAC addresses of those ARP response packets. As set forth below, modifying the ARP response packets to reflect the MAC address of a NIC selected by the hash engine 128 allows the LBFO module 126, instead of the operating system 122, to control which NIC receives packets from the remote computing device. Thus, an intelligent NIC selection by the hash engine 128, incorporated into an ARP response packet, leads to the corresponding connection being received on the NIC selected by the LBFO module 126 rather than on another, less advantageous NIC.

In step 314, the LBFO module 126 decodes the intercepted ARP response packet into components, including the IP address of the remote computing device that the ARP response packet was addressed to. In step 315, the LBFO module 126 determines whether a connection relating to the ARP response packet exists and has already been offloaded to a hardware offload engine residing on a receive NIC. If the LBFO module 126 finds that the connection does not exist or that the connection exists but is not offloaded to a hardware offload engine residing on a receive NIC, the method continues to step 316, where the hash engine 128 selects a MAC address. This selection is based on the LBFO module 126 passing the IP address of the remote computing device as a parameter to the hash engine 128, as previously described above in FIG. 2.

In step 318, the LBFO module 126 replaces the MAC address selected by the operating system 122, in the decoded ARP response packet, with the selected MAC address. In step 320, the LBFO module 126 encodes the selected MAC address and the remaining components of the decoded ARP response packet to form an ARP response packet. In step 322, the LBFO module transmits the ARP response packet to the remote computing device, and the method terminates. In one embodiment, the ARP response packet is transmitted through the NIC that corresponds to the selected MAC address.

Returning now to step 315, if the LBFO module 126 finds that a connection relating to the intercepted ARP response packet exists and has already been offloaded to a hardware offload engine residing on a receive NIC, then the method continues to step 317. In step 317, the hash engine 128 selects the MAC address of the receive NIC before proceeding to modify the ARP response packet, encode the packet, and transmit the packet, as previously described above in steps 318-322.

Figure 4A:
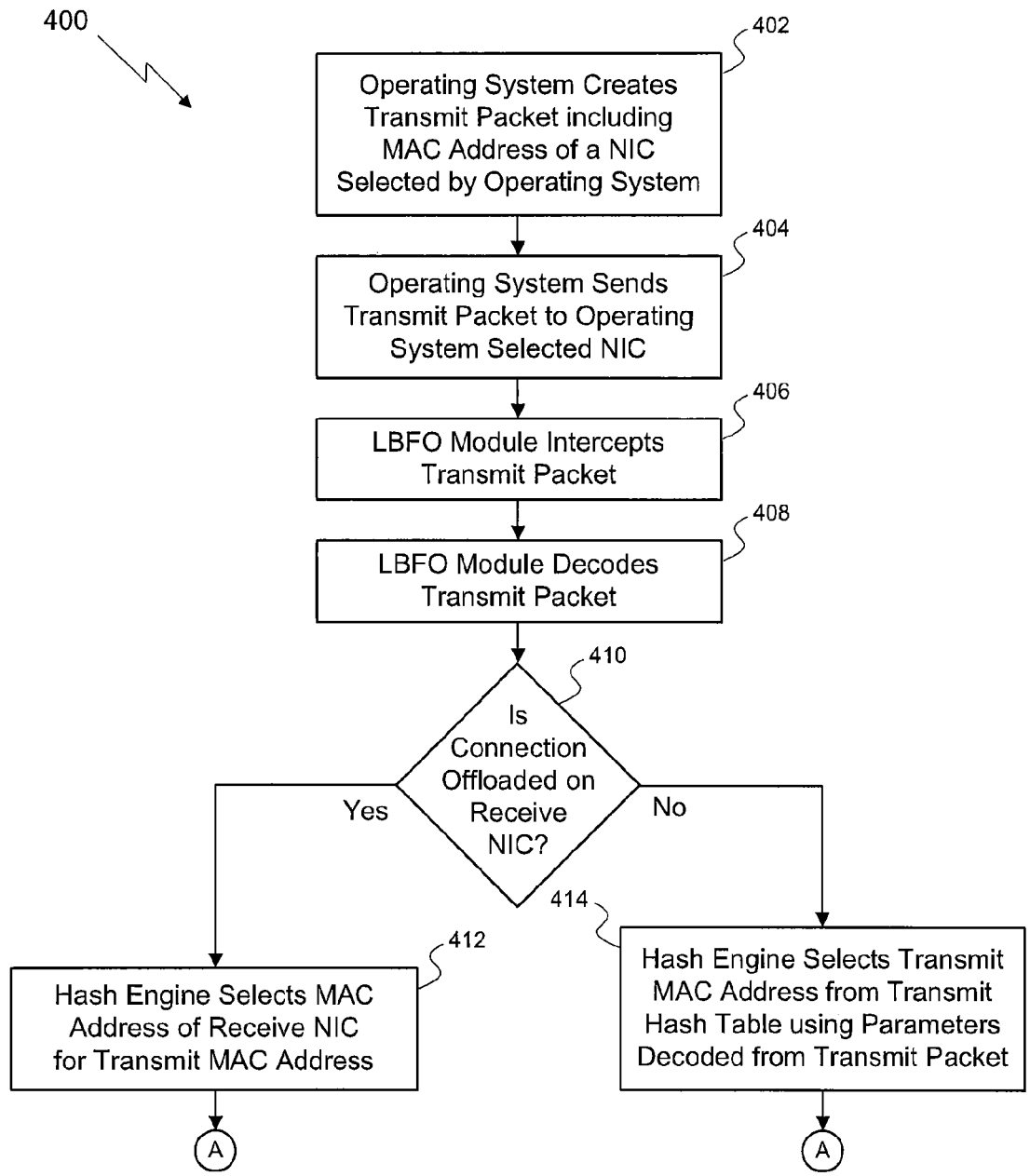
FIGS. 4A and 4B illustrate a flowchart of method steps for transferring a connection to a NIC selected by the hash engine to transmit network traffic, according to one embodiment of the invention.
Figure 4B:
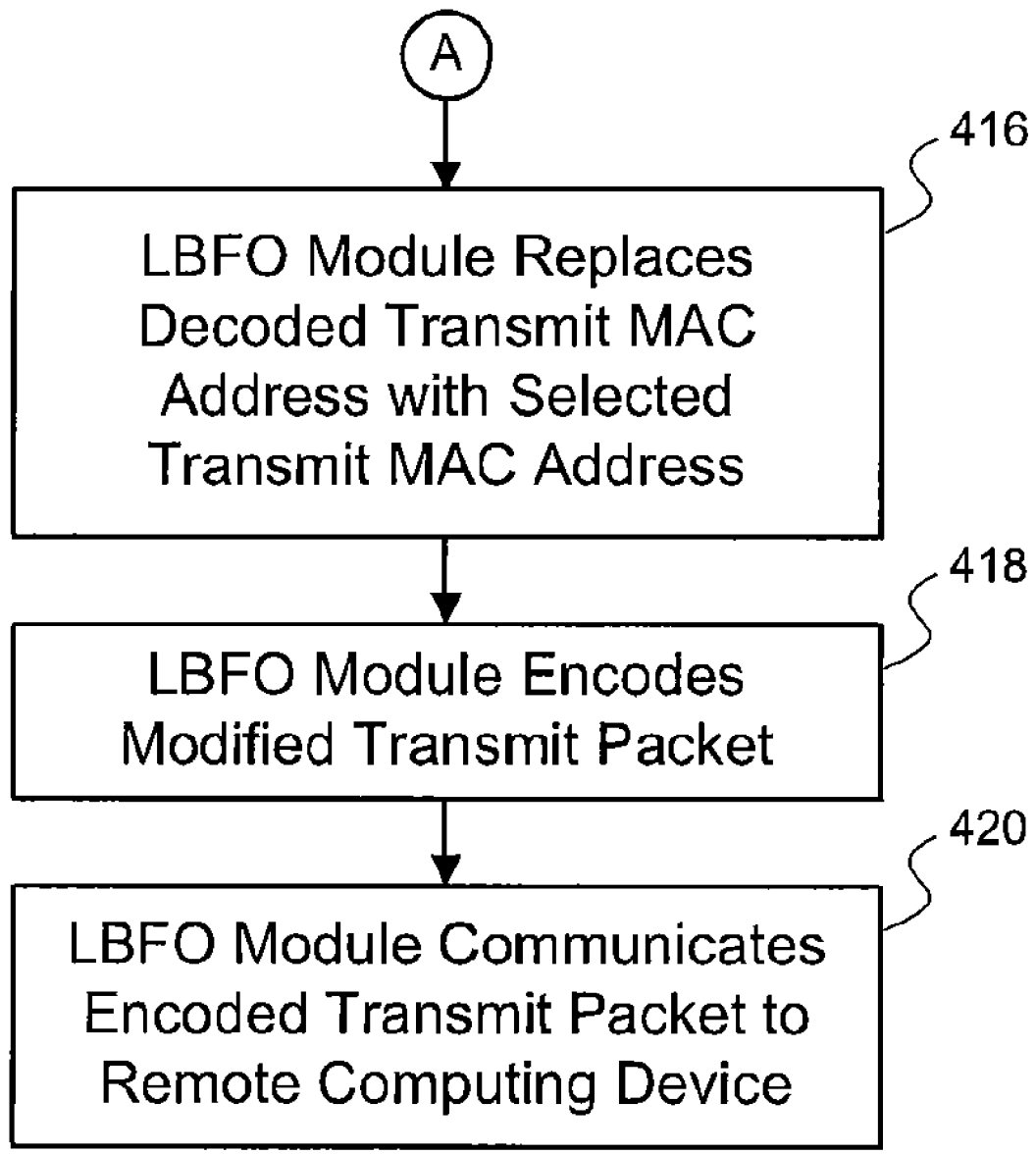

FIGS. 4A and 4B illustrate a flowchart of method steps 400 for transferring a connection to a NIC selected by the hash engine 128 to transmit network traffic, according to one embodiment of the invention. Although the method is described in reference to the computing device 100, persons skilled in the art will understand that any system configured to perform the method steps, in any order, is within the scope of the present invention.

As shown, the method for transferring a connection begins at step 402, where the operating system 122 creates a transmit packet, including the MAC address of a NIC selected by the operating system 122. For example, an application program may request the operating system 122 to create a transmit packet as part of ongoing communications between the computing device 100 and a remote computing device (not shown). For purposes of discussion only, it is assumed that the operating system 122 selects NIC 110 to send a transmit packet to the remote computing device.

In step 404, the operating system 122 sends the transmit packet created in step 402 to the NIC 110. In step 406, the LBFO module 126 intercepts the transmit packet sent from the operating system 122 to the NIC 110. As previously described herein, the LBFO module 126 is configured to intercept transmit packets sent from the operating system 122 to a NIC selected by the operating system 122 in the computing device 100 and to modify the MAC addresses of the intercepted transmit packets. Again, modifying the transmit packets to reflect the MAC address of a NIC selected by the hash engine 128 allows the LBFO module 126, instead of the operating system 122, to control which NIC sends transmit packets from the remote computing device. Thus, an intelligent NIC selection by the hash engine 128 leads to packets being transmitted on the NIC selected by the LBFO module 126 rather than on another, less advantageous NIC.

In step 408, the LBFO module 126 decodes the transmit packet from step 406 to identify one or more TCP/IP parameters of the transmit packet. In step 410, the LBFO module 126 determines whether the connection corresponding to the transmit packet has been offloaded to a hardware offload engine residing on a receive NIC. Again, if a connection has already been offloaded to a hardware offload engine residing on a receive NIC, packets for that connection are advantageously transmitted from the hardware offload engine residing on the receive NIC rather from software on a different NIC. Therefore, if the connection corresponding to the transmit packet has already been offloaded to a hardware offload engine residing on a receive NIC, in step 412, the hash engine 128 selects the MAC address of the receive NIC as the transmit MAC address.

In step 416, the LBFO module 126 replaces the decoded source MAC address with the transmit MAC address to form a modified decoded packet. In step 418, the LBFO module 126 encodes the modified decoded packet into a transmit packet. In step 420, the LBFO module 126 communicates the transmit packet to the remote computing device through the NIC corresponding to the transmit MAC address.

Returning now to step 410, if the connection corresponding to the transmit packet has not been offloaded to a hardware offload engine residing on a receive NIC, the method continues to step 414. In step 414, the hash engine 128 selects the transmit MAC address from the transmit hash table 138, as described above in FIG. 2, using the TCP/IP parameters decoded from the transmit packet in step 408. The method then proceeds to steps 416-420, as described above.

Figure 5:
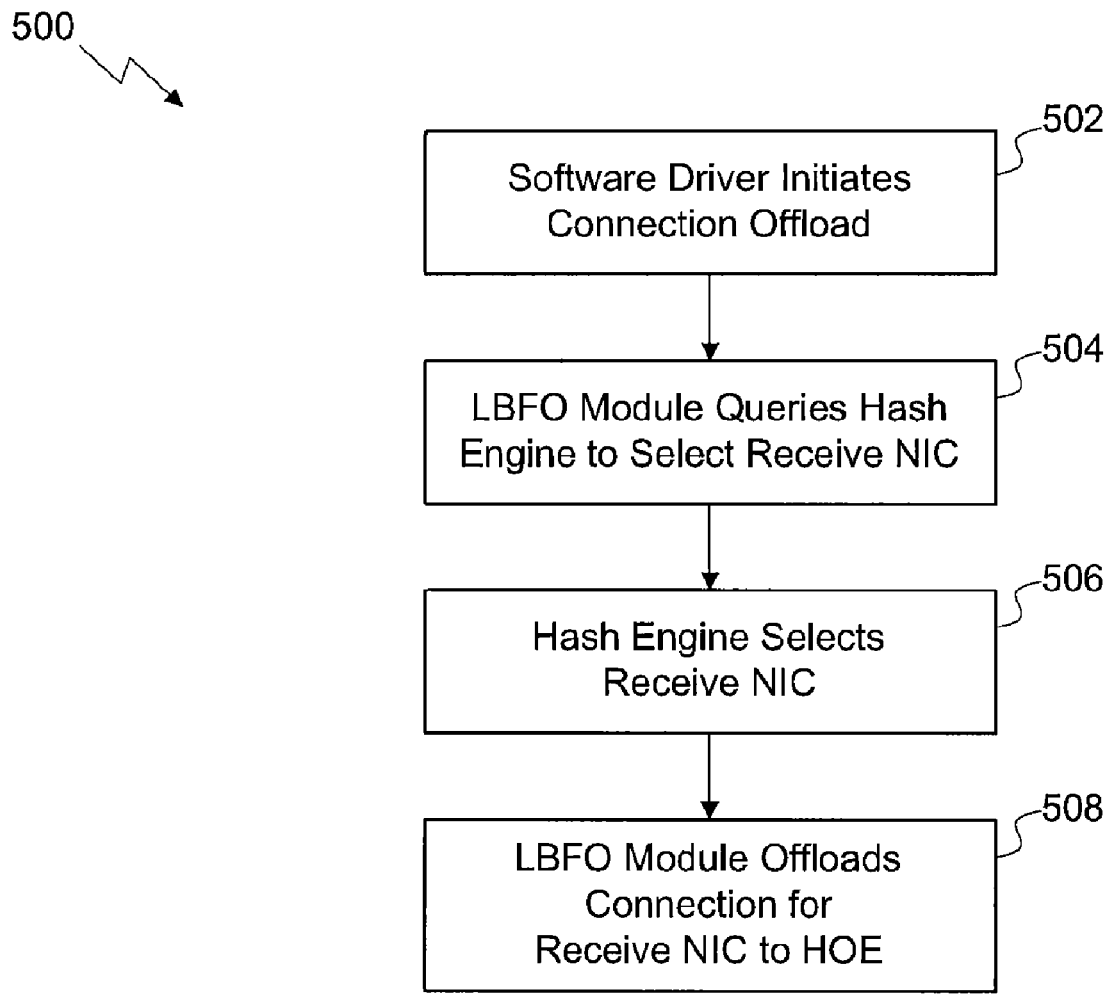
FIG. 5 illustrates a flowchart of method steps for offloading an existing connection to a NIC selected by the hash engine, according to one embodiment of the invention.

FIG. 5 illustrates a flowchart of method steps 500 for offloading an existing connection to a NIC selected by the hash engine 128, according to one embodiment of the invention. Although the method is described in reference to the computing device 100, persons skilled in the art will understand that any system configured to perform the method steps, in any order, is within the scope of the present invention.

As shown, the method for offloading an existing connection begins at step 502, where the software driver 124 initiates an operation to offload the existing connection. The software driver 124 may initiate an offload operation at the request of the operating system 122 or based on certain processing operations performed by the software driver 124. The software driver 124 may, for example, determine that the existing connection is a high-traffic connection that would be better processed by a hardware offload engine.

In step 504, the LBFO module 126 queries the hash engine 128 to select a new NIC to receive network traffic associated with the connection. In step 506, the hash engine 128 uses the receive hash table 140 to determine which NIC and hardware offload engine within the computing device 100 should be selected to receive network traffic associated with the connection. The selected NIC and hardware offload engine may, for example, be carrying the least average load, have the least number of offloaded connections, or may be connected to the most reliable physical link. In step 508, the LBFO module 126 offloads the receive NIC to the selected NIC and hardware offload engine.

Figure 6:
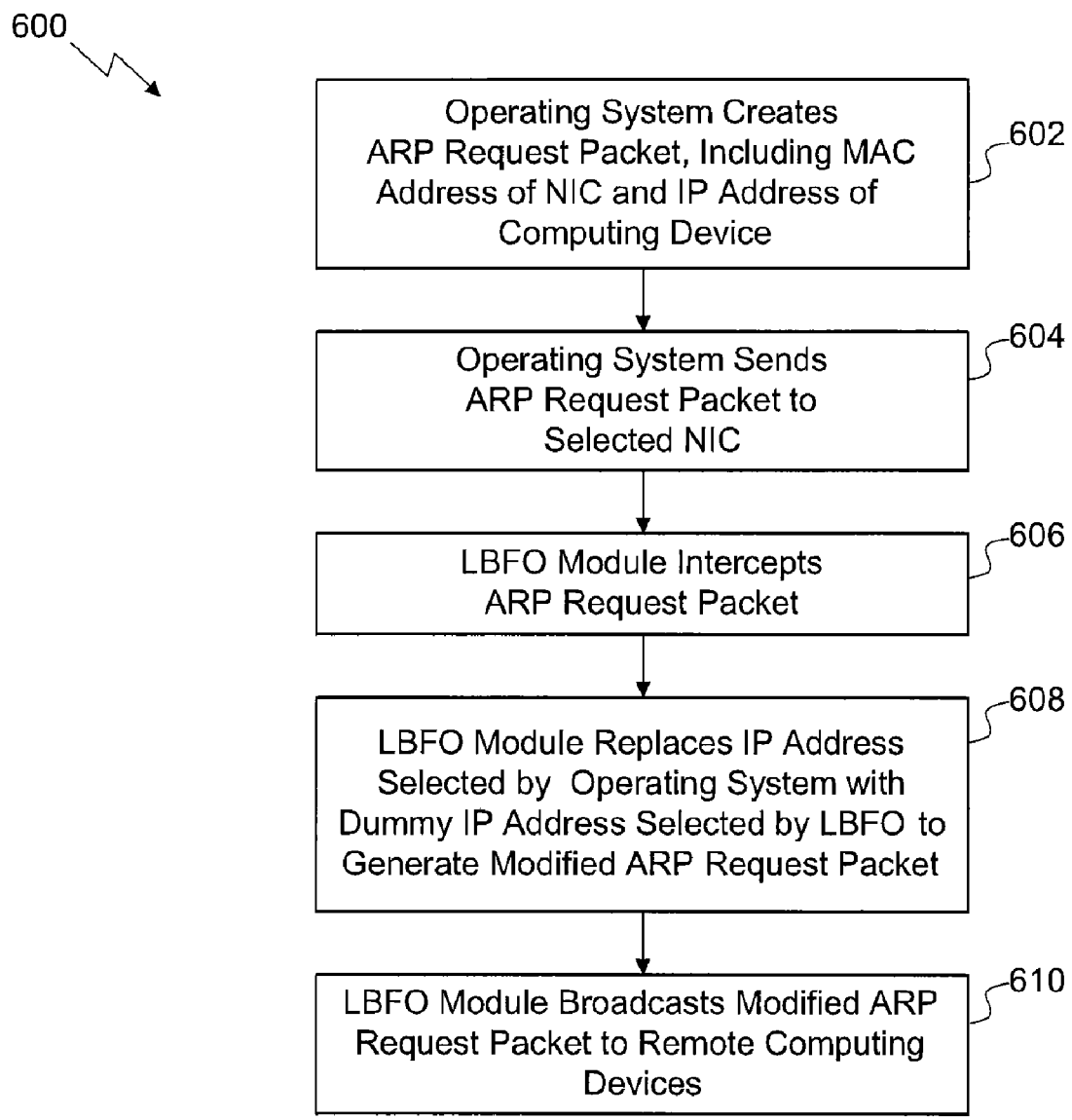
FIG. 6 illustrates a flowchart of method steps for performing an address resolution protocol request using a dummy Internet protocol address, according to one embodiment of the invention.

FIG. 6 illustrates a flowchart of method steps 600 for performing an address resolution protocol (ARP) request using a dummy Internet protocol address, according to one embodiment of the invention. Although the method is described in reference to the computing device 100, persons skilled in the art will understand that any system configured to perform the method steps, in any order, is within the scope of the present invention.

As shown, the method of performing the address resolution protocol request begins in step 602, where the operating system 122 creates an ARP request packet that includes a MAC address of the NIC selected by the operating system 122 to receive network traffic associated with a connection being established and the IP address of the computing device 100. The IP address may be assigned to the computing device 100 manually or through an automated technique, such as the industry standard dynamic host configuration protocol (DHCP). The MAC address may correspond to the default or primary NIC recognized by the operating system 122. In step 604, the operating system 122 sends the ARP request packet to the selected NIC.

In step 606, the LBFO module 126 intercepts the ARP request packet before the ARP request packet is presented to the selected NIC for transmission. In step 608, the LBFO module 126 replaces the IP address of the computing device 100 with a dummy IP address selected by the LBFO module 126, generating a modified ARP request packet. The dummy IP address should be an un-mapped IP address within the network. For example, in a network with IP addresses ranging from 10.1.1.0 through 10.1.1.255, one IP address, such as 10.1.1.254, may be reserved as a dummy IP address by the network administrator. In this example, a device receiving the ARP request packet may update a local ARP cache entry for the dummy IP address with a new MAC address, thereby avoiding corrupting the cache entry for the IP address of the computing device 100. The dummy IP address may be established for use by the LBFO module 126 through any technically feasible means, including manual configuration. In step 610, the LBFO module 126 broadcasts the modified ARP request packet through the selected NIC to one or more remote computing devices attached to the same network as the computing device 100.

The method of FIG. 6 enables the LBFO module 126 to manage the ARP request process over multiple NICs without involving the operating system 122. Further, the method may be used to avoid corrupting the ARP caches maintained by the remote computing devices that receive the modified ARP request packets.

One advantage of the disclosed systems and method is that they allow network connections to be intelligently transferred across multiple NICs in a computing device using a hash engine. Connection transfer may be employed to perform load balancing, failover, or failback functions. In this fashion, running network connections through overloaded or unreliable NICs may be more easily avoided, thereby improving overall network performance. Another advantage is that using the hash engine to manage the assignment of connections to respective NICs allows for efficient determination of which NIC is handling each connection, while avoiding the complex and computationally expensive process of managing connection state.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention. Therefore, the scope of the present invention is determined by the claims that follow

We claim:

1. A method for intelligently transferring a network connection to a network interface card (NIC) for transmitting network traffic, the method comprising:
    configuring a processor to perform an operation, comprising:
        intercepting a transmit packet generated by an operating system, wherein the transmit packet includes a first media access control (MAC) address associated with a first NIC in a plurality of NICs that has been selected by the operating system to transmit network traffic related to the network connection;
        decoding the transmit packet;
        generating a hash table index associated with a hash table entry based on a hash function and on one more network parameters included in the decoded transmit packet; reading the hash table entry based on the hash table index; determining if the hash table entry is valid; when
        the hash table entry is valid, generating a second MAC address associated with a second NIC in the plurality of NICs based on the hash table entry, or
        when the hash table entry is invalid, generating the second MAC address associated with the second NIC based on a weighted combination of NIC utilization data and NIC error rate data associated with the plurality of NICs; and
        replacing the first MAC address in the transmit packet with the second MAC address.

2. The method of claim 1, further comprising the steps of encoding the transmit packet that includes the second MAC address and transmitting the encoded transmit packet to a remote computing device.

3. The method of claim 2, wherein the second NIC transmits network traffic related to the network connection instead of the first NIC.

4. The method of claim 2, wherein the one or more network parameters provided to the hash function include an internet protocol (IP) address of the remote computing device, a transmission control protocol (TCP) port of the remote computing device, and a TCP port of a transmitting computing device.

5. The method of claim 4, wherein the one or more network parameters provided to the hash function also include a virtual local area network identifier.

6. The method of claim 1, wherein generating the second MAC address associated with the second NIC based on a weighted combination of NIC utilization data and NIC error rate data associated with the plurality of NICs comprises determining that NIC utilization data and NIC error rate data associated with the second NIC is lower than NIC utilization data and NIC error rate data associated with at least one other NIC of the plurality of NICs.

7. A computer-readable storage medium that includes instructions that when executed cause a processor to intelligently transfer a network connection to a network interface card (NIC) for transmitting network traffic, by performing the steps of:
    intercepting a transmit packet generated by an operating system, wherein the transmit packet includes a first media access control (MAC) address associated with a first NIC in a plurality of NICs that has been selected by the operating system to transmit network traffic related to the network connection;
    decoding the transmit packet;
    generating a hash table index associated with a hash table entry based on a hash function and one more network parameters included in the decoded transmit packet; reading the hash table entry based on the hash table index; determining if the hash table entry is valid; when the hash table entry is valid, generating a second MAC address associated with a second NIC in the plurality of NICs based on the hash table entry, or
    when the hash table entry is invalid, generating the second MAC address associated with the second NIC based on a weighted combination of NIC utilization data and NIC error rate data associated with the plurality of NICs; and
    replacing the first MAC address in the transmit packet with the second MAC address.

8. The computer-readable storage medium of claim 7, further comprising the steps of encoding the transmit packet that includes the second MAC address and transmitting the encoded transmit packet to a remote computing device.

9. The computer-readable storage medium of claim 8, wherein the one or more network parameters provided to the hash function include an internet protocol (IP) address of the remote computing device, a transmission control protocol (TCP) port of the remote computing device, and a TCP port of a transmitting computing device.

10. The computer-readable storage medium of claim 9, wherein the one or more network parameters provided to the hash function also include a virtual local area network identifier.

11. The computer-readable storage medium of claim 7, wherein generating the second MAC address associated with the second NIC based on a weighted combination of NIC utilization data and NIC error rate data associated with the plurality of NICs comprises determining that NIC utilization data and NIC error rate data associated with the second NIC is lower than NIC utilization data and NIC error rate data associated with at least one other NIC of the plurality of NICs.

12. A computing device configured to intelligently transfer a network connection to a network interface card (NIC) for receiving network traffic, the computing device comprising:
- a processor;
- an operating system configured to generate a transmit packet in response to receiving an ARP request packet, wherein the transmit packet includes a first media access control (MAC) address associated with a first NIC in a plurality of NIC that has been selected by the operating system to transmit network traffic related to the network connection; and
- a load-balancing failover (LBFO) module configured to:
  - intercept the transmit packet generated by the operating system;
  - decode the transmit packet;
  - generate a hash table index associated with a hash table entry based on a hash function and one more network parameters included in the decoded transmit packet; reading the hash table entry based on the hash table index; determining if the hash table entry is valid; when
  - the hash table entry is valid, generate a second MAC address associated with a second NIC in the plurality of NICs based on the hash table entry, or
  - when the hash table entry is invalid, generate the second MAC address associated with the second NIC based on a weighted combination of NIC utilization data and NIC error rate data associated with the plurality of NICs; and
  - replace the first MAC address in the transmit packet with the second MAC address.

13. The computing device of claim 12, wherein the LBFO module is further configured to encode the transmit packet that includes the second MAC address and transmit the encoded transmit packet to a remote computing device.

14. The computing device of claim 13, wherein the one or more network parameters provided to the hash function include an internet protocol (IP) address of the remote computing device, a transmission control protocol (TCP) port of the remote computing device, and a TCP port of the computing device.

15. The computing device of claim 14, wherein the one or more network parameters provided to the hash function also include a virtual local area network identifier.

16. The computing device of claim 12, wherein the LBFO is further configured to determine that NIC utilization data and NIC error rate data associated with the second NIC is lower than NIC utilization data and NIC error rate data associated with at least one other NIC of the plurality of NICs when the hash table entry is invalid.

* * * * *